(12) United States Patent
Milward et al.

(10) Patent No.: US 9,208,217 B2
(45) Date of Patent: Dec. 8, 2015

(54) PROVIDING USERS WITH A PREVIEW OF TEXT MINING RESULTS FROM QUERIES OVER UNSTRUCTURED OR SEMI-STRUCTURED TEXT

(75) Inventors: David R. Milward, Cambridge (GB); Roger W. Hale, Cambridge (GB); Malcolm R. Parsons, Cambridge (GB); Sylvia F. Knight, Cambridge (GB); Christopher I. Sullivan, Cambridge (GB); Jason Trenouth, Herts (GB); James R. Thomas, Cambridge (GB)

(73) Assignee: Linguamatics Ltd., Cambridge (GB)

( * ) Notice: Subject to any disclaimer, the term of this patent is extended or adjusted under 35 U.S.C. 154(b) by 363 days.

(21) Appl. No.: 12/899,478

(22) Filed: Oct. 6, 2010

(65) Prior Publication Data

US 2012/0089642 A1 Apr. 12, 2012

(51) Int. Cl.
*G06F 17/30* (2006.01)

(52) U.S. Cl.
CPC .............. *G06F 17/30616* (2013.01)

(58) Field of Classification Search
CPC .............................. G06F 17/30616
See application file for complete search history.

(56) References Cited

U.S. PATENT DOCUMENTS

2008/0301094 A1* 12/2008 Zhu et al. .......... 707/3
2008/0301129 A1 12/2008 Milward et al.
2009/0204610 A1* 8/2009 Hellstrom et al. ....... 707/5

* cited by examiner

*Primary Examiner* — Jacob F Bétit
*Assistant Examiner* — Johnese Johnson
(74) *Attorney, Agent, or Firm* — Perkins Coie LLP (57) ABSTRACT

The system and methods described herein provide results previewing for an interactive text mining system in order to feedback partial query results to users before all results that are responsive to a query have been found. These partial results allow the user to see the progress of their text mining query much sooner.

23 Claims, 5 Drawing Sheets

| [PT] Chemical | [NID] | Chemical | Dosage | Doc | Hit |
|---|---|---|---|---|---|
| Cyclosporine | C406 | | 5 mg/kg | 7 20448265 | 2 Furthermore, L-arginine pretreatment with cyclosporine A (5 mg/kg) significantly reversed the protective effect of cyclosporine A. However, L-nitro-arginine methyl ester (L-NAME; 10 mg/kg) pretreatment potentiated the protective effect of cyclosporine A (5 mg/kg). |
| | | | | 115 | |
| Sirolimus | C1212 | | 2 mg | 2 19196220 | 2 METHODS: Twelve healthy subjects received one dose of sirolimus 2 mg on day 1. |
| Etanercept | C2381 | | 25 mg | 9 20683738 | 2 Extended dosing of etanercept 25 mg can be effective in patients with ankylosing spondylitis: a retrospective analysis. |
| Tacrolimus | C1311 | | 1 mg/day | 2 19489865 | 1 Four weeks after the start of oral tacrolimus 1 mg/day, the eruption completely resolved. |

*FIG. 5*

PROVIDING USERS WITH A PREVIEW OF TEXT MINING RESULTS FROM QUERIES OVER UNSTRUCTURED OR SEMI-STRUCTURED TEXT

BACKGROUND

Large organizations such as pharmaceutical companies and healthcare organizations have a massive amount of information available to them. This may include, for example, ongoing and historical clinical trials and studies, treatment guidelines, patient information, patents, research documents, external research literature, news articles, as well as information on the web. Most of this information is in the form of unstructured or semi-structured text (e.g. XML). The vast quantities make it hard to read, even with the help of a search engine to prune down the number of relevant documents.

Conventional systems do not provide results directly from the semi-structured or unstructured text in a format that can be used directly for decision making. Search engines do not provide any structure, other than the structure in the original document. Information extraction systems do not use an index, so cannot provide fast interactive querying, nor do they allow a flexible mix of constraints based on linguistic constructions and the structure of the document.

Text mining converts unstructured or semi-structured text within a set of documents into structured facts and relationships. Some examples of text mining techniques are described in commonly-assigned U.S. patent application Ser. No. 12/133,205, entitled "Extracting and Displaying Compact and Sorted Results from Queries over Unstructured or Semi-Structured Text," filed on Jun. 4, 2008, now U.S. Publication Number US-2008-0301129-A1 which is hereby incorporated by reference herein in its entirety. As described in this patent application, text mining techniques may generate and utilize a text mining index that provides an efficient representation of the content of a set of documents. For each source document in the set, a text mining index, may for example, encode the regions (e.g., Abstract, Acknowledgements, Authors, Body, Figures, Figure Text, Paragraphs, Tables, Table Row, References, Keywords, Title, etc.) of the source document; the text of the source document; and the start and end positions of linguistic units, such as sentences, noun groups, verb groups, etc. The index may also identify the concepts (e.g. breast cancer) that are present in a document (and their position within the document), whether these concepts are referred to by the standard or preferred name (e.g. breast cancer) or by a synonym (e.g. breast carcinoma, breast neoplasm, cancer of the breast etc.). In addition, the index may also identify broader classes, such as, e.g., people, companies, amounts, temporal expressions, etc. that are present in the document and their positions within the document In some examples of text mining, such as those described in the above patent application, a graphical user interface ("GUI") allows users to create and run their own text-mining queries against a text mining index. When these queries are run on small document sets (i.e., against a small text mining index), this gives the user an interactive experience, similar to a search engine, with users getting all results back within a few seconds in a compact and sorted manner. However, text mining is a more computationally expensive process than search and, when querying large document sets, the user may need to wait some time to get all results back. The user may not need to see all results in order to judge their value, just as in a search engine results are typically delivered one page at a time. Furthermore, text mining querying is typically an iterative process, with users creating a query, seeing results, then refining the query to get better quality answers. Any waiting during this process increases the cycle time for each iteration, and this can have a large effect on the time taken from having an initial query intention, and getting back high quality answers to that query.

The foregoing examples of some existing problems with text mining are intended to be illustrative and not exclusive. Other limitations will become apparent to those of skill in the art upon a reading of the Detailed Description below.

DETAILED DESCRIPTION

The system and methods described herein provide results previewing for an interactive text mining system in order to feedback partial query results to users before all results that are responsive to a query have been found. These partial results allow the user to see the progress of their text mining query much sooner.

Various embodiments of the invention will now be described. The following description provides specific details for a thorough understanding and enabling description of these embodiments. One skilled in the art will understand, however, that the invention may be practiced without many of these details. Additionally, some well-known structures or functions may not be shown or described in detail, so as to avoid obscuring the description of the various embodiments.

The terminology used in the description presented below is intended to be interpreted in its broadest reasonable manner, even though it is being used in conjunction with a detailed description of certain specific embodiments of the invention. Certain terms may even be emphasized below; however, any terminology intended to be interpreted in any restricted manner will be overtly and specifically defined as such in this Detailed Description section.

Suitable Environment

Figure 1:
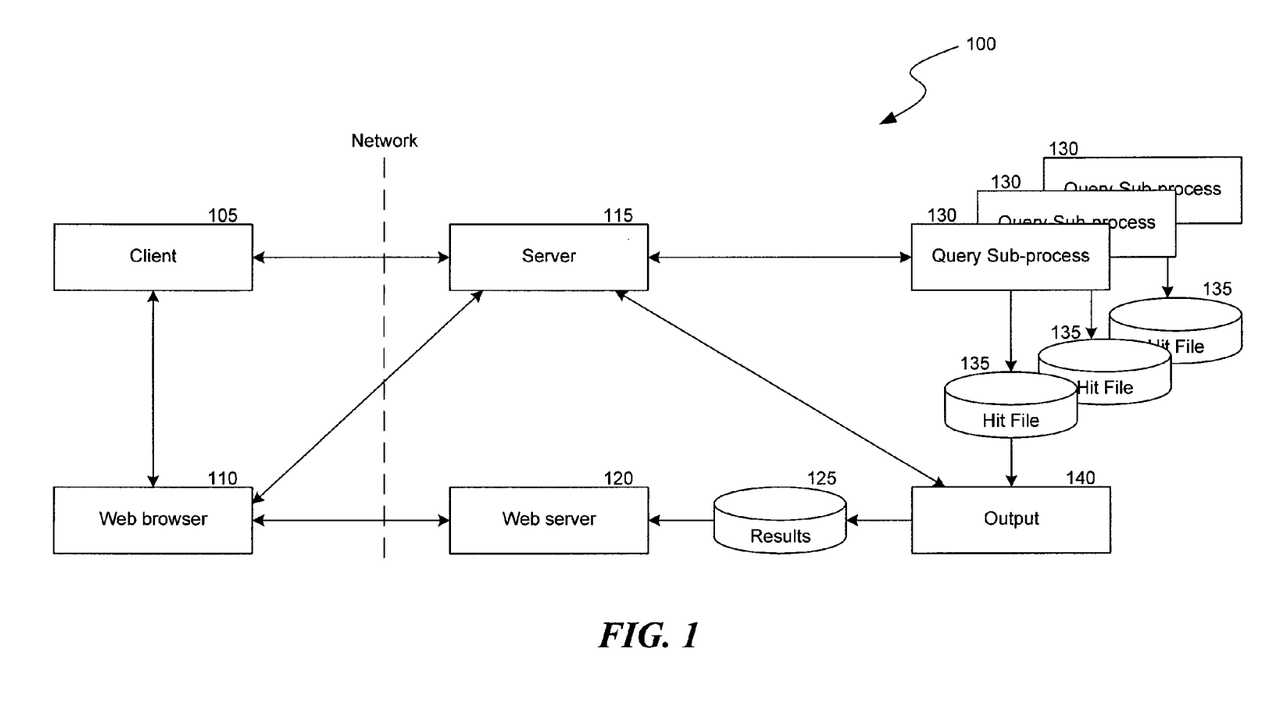
FIG. 1 is a block diagram of a suitable environment for practicing the methods described herein.

FIG. 1 is a block diagram of a suitable environment 100 for practicing the methods described herein. As shown, the environment may include a client 105, a web browser 110, a server 115, a web server 120, one or more query sub-processes 130, one or more hit files 135, an output engine 140, and a results data store 125. As shown, the client 105 and/or web browser 110 may be communicatively coupled to the server and web server over a communications network, such as a Local Area Network (LAN), Wide Area Network (WAN), or the Internet.

Among other functionality, the query client 105 (or simply "client") is configured to permit a user to define a text mining query and initiate the query with the server 115. For example, the client may provide a graphical user interface ("GUI") for creating a text mining query, such as a search-style text box or a graphical drag and drop interface. When defining a text mining query via the client, a user may impose a variety of query constraints. The constraints of a query may include, for example, keywords, concepts, classes, linguistic patterns, regions, metadata values, etc. For example, a user may specify a query for documents containing a word in the title region, and having a particular concept (e.g., a neurological disease) in the description section of that document within three words of a company. A user may also utilize the client to specify which set of documents (i.e., which text mining index or indices) the query constraints should be tested or evaluated against.

Linguistic patterns specified by a query may include classes (e.g., drugs, dosages, companies, people, genes, proteins, etc.), entities, concepts or other linguistic units in a particular structure within a sentence, within a group of sentences, or within a document. This includes the classes, entities, or concepts being at a certain word distance, or in a syntactic or semantic relationship composed from linguistic units such as noun groups, verb groups or prepositions. For example, a user may specify that they want to find documents where the concepts of "breast cancer" and "geneX" appear in the same sentence, and are separated by at most 5 words. As another example, a user may specify that they want to find documents where the concepts of "breast cancer" and "geneX" are separated by at most 5 words, regardless of whether they are in the same sentence. As yet another example, a user may specify that they want to find documents where the concepts of "breast cancer" and "geneX" are separated by no more than five sentences. A linguistic pattern may specify an ordering to its components, or may not require an order. For example, a user may specify that they want to find documents where the concepts of "breast cancer" and "geneX" appear in the same sentence, are separated by at most 5 words, and "breast cancer" appears before "geneX." As another example, a user may specify that they want to find documents where the concepts of "breast cancer" and "geneX" appear in the same sentence, are separated by at most 5 words, and "breast cancer" may appear before or after "geneX."

In some examples, a user may use the client 105 to define a "multi-query," that is a query that implements a particular combination of two or more discrete, constituent queries. For example, a user may define a multi-query that combines the results of two or more discrete queries using one or more combination operations, such as one or more of the following operations: addition, intersection, difference, subtraction, priority union, union, and join. In some examples, these operations may be nested, e.g., so that the result of a first operation is subjected to a second operation. In some examples, a user may utilize the client 105 to identify or define one or more taxonomies that may be used to evaluate a query. For example, a query sub-process or other component may use a specified taxonomy to expand a query to search for synonyms of a concept (or multiple concepts) of a query. In some examples, a user may also specify via the client 105 a desired output format or organization, such as a clustering and/or ordering format that should be utilized when text mining results are provided.

Generally speaking, the server 115 is responsible for receiving a query request from a client 105, executing the requested query, and as the query is executing, providing the user with a partial list of responsive results and an indication of the progress of the query. To do so, the server 115 may coordinate and communicate with the query sub-processes 130, output engine 140, and/or web browser 110.

When the server 115 receives a query request from the client 105, including specified query constraints, the server executes the query by initiating one or more query sub-processes 130. A query sub-process 130 evaluates the received constraints of a query against a text mining index that efficiently represents the contents of a set of documents. As described in greater detail herein, when a document represented in the index matches some or all of the specified query constraints, the query sub-process writes a "hit" that describes the details of the match to a hit file 135. Thus, each "hit" represents an instantiation of a specified query pattern or constraint.

In some examples, the server 115 executes a query in a parallel fashion by initiating two or more query sub-processes 130 that run in parallel. Each query sub-process tests the query constraints against a sub-index that represents only a subset of the body of documents that the user wishes to mine. There may be more than one hit file 135. For example, as described in greater detail herein, separate query sub-processes 130 may write to separate hit files. As another example, as described in greater detail herein, when executing a multi-query, the hits for each discrete, constituent query within the multi-query may be written to a separate hit file.

As a query sub-process 130 is evaluating the query constraints against an index, it may send query progress notifications to the server 115. The server 115 may use these progress notifications to apprise the user of the progress that is being made to execute the requested query. The server 115 may also use these notifications to determine when and how to display a partial list of query results to the user.

Generally speaking, the output engine 140 analyzes, combines, organizes, formats, and/or otherwise manipulates or reformulates some subset of the hit files 135 in order to generate a properly formatted (e.g., properly sorted and clustered) list of results 125 that are responsive to the user's query; the results generated may be only a partial list of results. As described in greater detail herein with respect to FIGS. 2 and 4, as the various query sub-processes 130 continue to traverse indices looking for new hits, the server 115 may request that the output engine 140 process a portion of the hit files 135 in order to generate a partial list of results that are responsive to the user's query. As described herein, the server 115 may request the partial list of results upon the occurrence of certain conditions or upon receiving a user request. As one example of the functionality performed by the output engine, if a user has requested the intersection of two discrete queries, the output engine may analyze some portion of two separate hit files (each associated with a discrete query) in order to determine which hits are common to the two discrete queries. As another example, if a user has requested that the results be provided in a certain clustered format, the output engine may perform post-processing on a portion of a hit file in order to produce results having the requested clustered format. In some examples, the output engine determines the format and/or the form of the results based on the constraints of the query. In some examples, the output engine determines the format and/or the form of the results based on display preferences specified by the user. The user's display preferences may be specified as part of a query, stored within a user profile, or indicated by the user, e.g., using a graphical user interface.

Once partial query results 125 are generated by the output engine 140, the server 115 may provide the partial list of results to the client 105. In some examples, the output engine may create a results set 125 to be served by a web server 120, and the server 115 provides a uniform resource locator ("URL") or similar address associated with the web server 120 to provide access to the results. In this way, the client may obtain and display the results in an HTML or similar format via a web browser 110. Of course, the server 115 may provide the partial list of results to the client 105 in any other format or by intermediaries other than a web server and web browser. For example, the partial results may be provided in a variety of formats, including, but not limited to (Excel format), XML, CSV (comma separated list), TSV (tab separated list), network graph languages (e.g., SIF, XGMML, or another format suitable for a network visualizer such as Cytoscape), etc.

Figure 5:
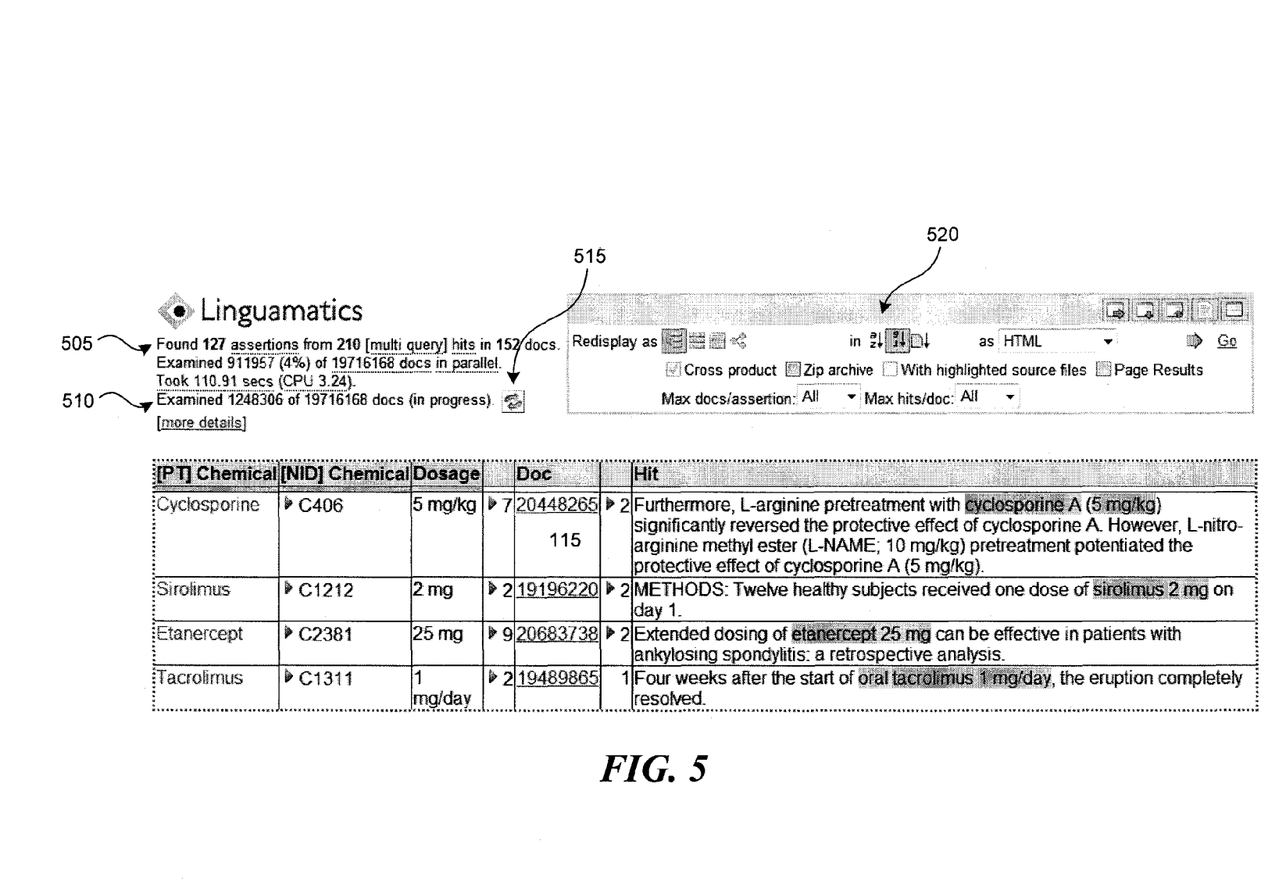
FIG. 5 shows one example of a partial list of text mining results that may be generated and displayed to a user.

FIG. 5 shows one example of a partial list of results that may be generated by an output engine 140 and displayed to a user, e.g., via a web browser 110. FIG. 5 will be described in greater detail at various points herein. The partial results show, for example, hits in documents, or facts or relationships derived from multiple hits within a single document or from multiple hits within multiple documents. Results may be clustered or ordered in different ways. As shown, the partial list of results may provide a variety of controls 520 that allow a user to change how the results are displayed. For example, the display may provide controls that allow the user to add or remove columns, order the results (e.g., by a document identifier, by the frequency of a term or terms within a document or region, alphanumerically, etc.), etc. In some examples, the partial results are also displayed in conjunction with controls (e.g., arrow controls) that enable the user to drill down within a particular result to examine the evidence for that result. Such controls allow the user to open (or close) a row to show (or hide) the documents corresponding to a particular result. As shown, in some examples, the partial results are displayed in conjunction with highlighted text areas that are relevant to the query, since they provide evidence of the results. As shown in FIG. 5, those highlighted text areas may include the text of entire sentences (or multiple sentences) and/or entire regions (e.g., an entire Abstract region). The displayed results may also provide hyperlinks to the documents identified by the particular query.

As shown in FIG. 5, the output engine 140 groups or clusters the results, e.g., grouped by column from left to right. For example, the results may be grouped according to a preferred term, frequency, concept, string, class, or character position. By grouping results, relationships among terms of the query are identified for the user. As shown in FIG. 5, the output engine 140 may group the results by concept identifiers (also known as node identifiers or "NID") (e.g., "C406"), and those results may be shown in conjunction with a preferred term (or "PT") for the concept identifier (e.g., "Cyclosporine").

In some examples (not shown in FIG. 5), the left-most "key" grouping column may contain a sentence. This type of grouping may be useful, for example, if a user is trying to determine what assertions or facts are evidenced by a sentence within a document. To illustrate, a single sentence may evidence two assertions or facts: (1) that "breast cancer" is linked to the "geneX", and (2) that "medicine Y" inhibits "geneX." If that single sentence is displayed to the user, the user may then drill down (e.g., using an arrow) on the sentence to see the evidence (or hits) present in that sentence that supports each of these assertions.

In some other examples, partial results may be displayed as individual assertions or hits within a document. In some examples, individual assertions or hits may be ordered by the documents in which the results appear; the document order may be defined, for example, by alphanumeric document identifiers that may be defined by a text mining index.

Partial Text Mining Results

Figure 2:
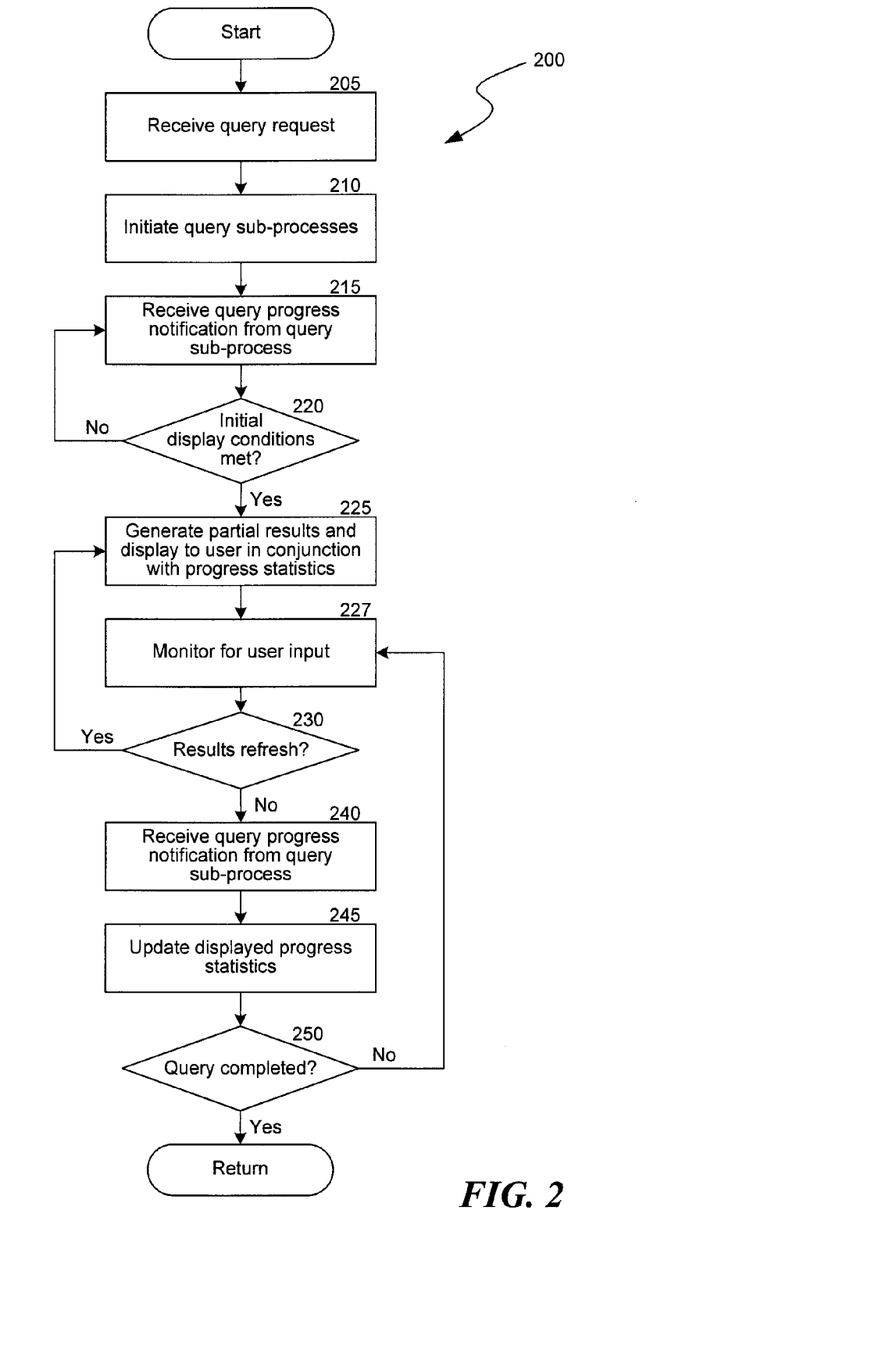
FIG. 2 is a flow diagram illustrating a process for providing partial text mining results to a user.

FIG. 2 is a flow diagram illustrating a process 200 for providing partial text mining results to a user. Although the process 200 is described as being performed by the server 115, it may in some examples be performed by other components in the environment 100 and/or in other environments. As shown, the process begins at block 205, when the server receives a query request, including query constraints and indication of the index against which the query constraints should be applied.

Figure 3:
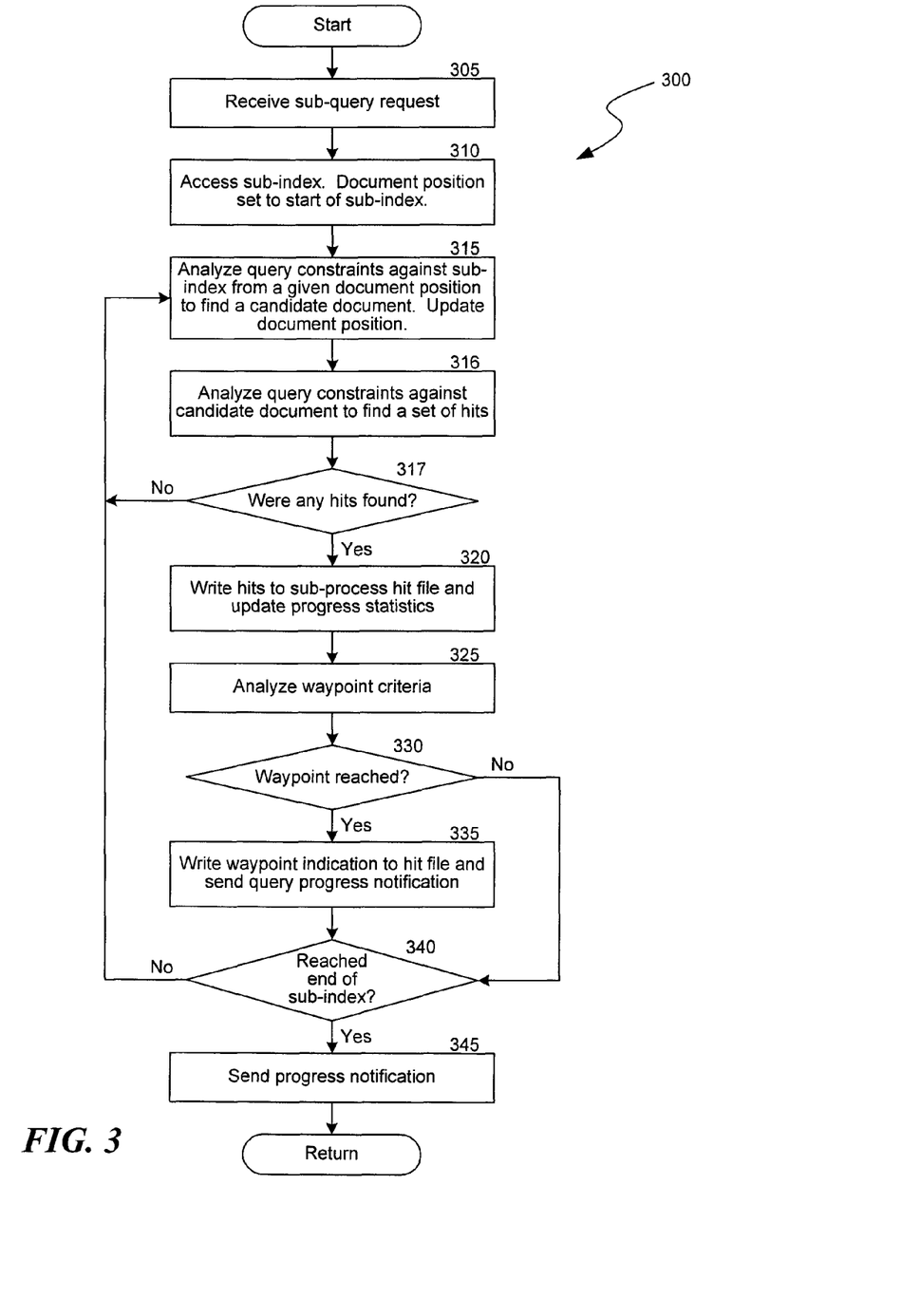
FIG. 3 is a flow diagram illustrating a process for performing a query sub-process so that partial text mining results may be presented to a user.

At block 210, the server 115 initiates one or more query sub-processes 130. FIG. 3 illustrates one example of a process that a query sub-process may implement at block 210. The number of sub-processes that are initiated may depend on configuration settings, machine loads, user preferences, whether a query is a multi-query or simple query, the index being used (e.g., if it comprises two or more constituent sub-indices), and/or other factors. The server may indicate to each query sub-process the query constraints and the index (or sub-index) the sub-process should utilize. The server may also provide each query sub-process with "waypoint criteria" that indicates when the query sub-process should report its partial progress back to the server 115.

A "waypoint" is a progress stage at which a query sub-process 130 should report its progress to the server 115 via a "query progress notification" and write a "waypoint indication" of its progress within its associated hit file 135. The use of waypoints permits the server to track the progress of the various query sub-processes. As explained in greater detail herein, by using waypoints, the server may help ensure that the partial results displayed to a user are consistent with the full results that will eventually be displayed to the user and are provided in a manner that is understandable to the user. "Waypoint criteria" define the timing of waypoints within a sub-process and may include factors such as the:

number of documents in an index that have been evaluated by a query sub-process,
   the number of hits found by a query sub-process (either since the last waypoint or in total),
   the time elapsed since the beginning of the sub-process and/or the last waypoint,
   the progress of other query sub-processes (e.g. other sub-processes running in parallel),
   other factors indicative of the progress of a sub-process, and/or
   a combination of such factors.

To illustrate, in some examples, the waypoint criteria may specify that a waypoint occurs either (a) every 1000 hits, or (b) every 5 seconds since the last waypoint (so long as at least one additional hit was found), whichever comes sooner.

At block 215 the server 115 receives a query progress notification from a query sub-process 130, e.g., when a sub-process reaches a waypoint. The query progress notification may indicate query progress statistics, such as the number of documents in an index (or sub-index) that the sub-process has evaluated against query constraints, the total number of documents in the index (or sub-index), the number of documents in the index (or sub-index) that the sub-process has not yet evaluated, the number of hits found, the time or CPU time used by the sub-process, and/or values that may be derived from these values (e.g., the percentage of the index that has been evaluated). As an example, after a query sub-process has been running for 5 seconds, the server may receive an indication from the sub-process that it has evaluated 12,150 documents against query constraints, out of an index of 600,000 documents, and found 782 hits among those 12,150 documents.

At decision block 220, the server 115 determines if initial display conditions have been met such that a partial results list should be generated and provided to the user. The initial display conditions may be specified by configuration settings and/or user preferences and may be defined in terms of the waypoint criteria factors described above, query constraints, and/or other factors. The initial display conditions may, for example, require that at least 1000 hits have been found by one query sub-process and/or 5 seconds has elapsed since the sub-processes were initiated at block 210. If the initial display conditions are met, the process 200 proceeds to block 225, otherwise, the process 200 returns to block 215.

Figure 4:
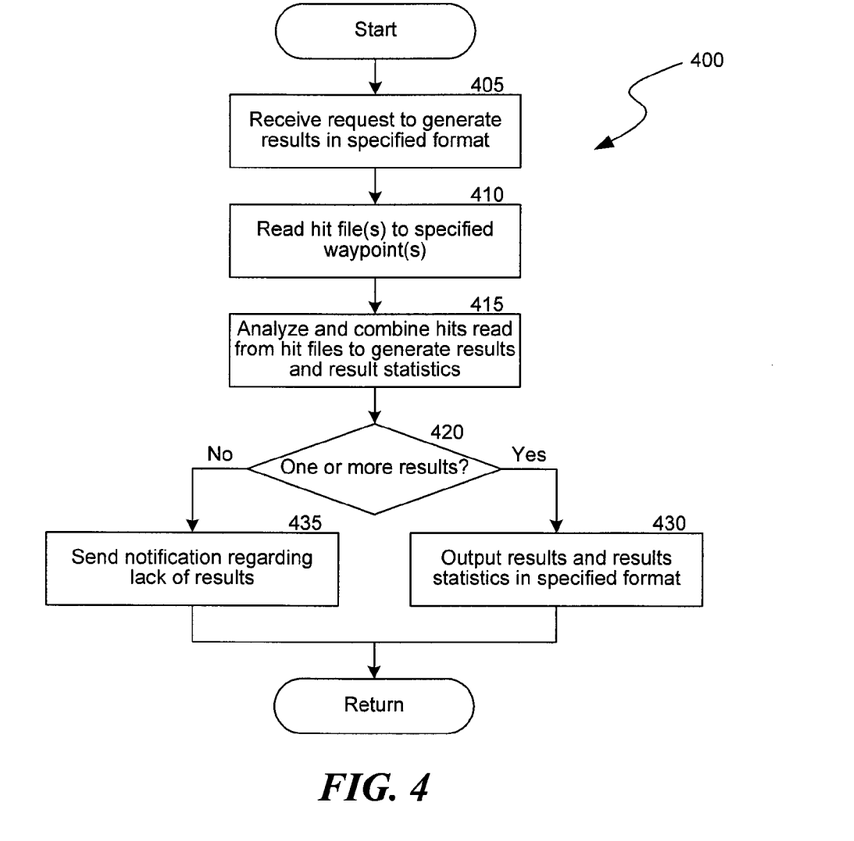
FIG. 4 is a flow diagram illustrating a process for generating text mining results so that partial text mining results may be presented to a user.

At block 225, the server 115 generates a partial list of results and displays or provides those to the user in conjunction with progress statistics and/or results statistics (e.g., via client 105 and/or web browser 110). To do so, the server 115 may request that the output engine 140 perform processing upon a portion of one or more hit files 135 generated by the query sub-processes 130 in order to generate partial results that are properly formatted (e.g., clustered and ordered). FIG. 4 shows one example process which the output engine may perform in order to generate partial results. In its request, the server 115 may indicate which hit files the output engine 140 should analyze or reformulate and may specify waypoint indications that the query sub-processes have written to those hit files. For example, if the server 115 has received a query progress notification indicating that a first query sub-process has written 782 hits to its hit file followed by a first waypoint indication, the server 115 may instruct the output engine 140 to read the hit file associated with that query sub-process until it reaches the first waypoint indication and analyze and reformulate those 782 hits in order to create meaningful results for the user. The server may also provide the output engine 140 with details of how the results should be organized and/or formatted, such as the clustering and/or ordering methods that should be utilized.

Although not shown in FIG. 2, as the output engine 140 performs processing upon hit files 135, the server 115 may receive results statistics from the output engine that indicate the number of results (e.g., the number of "assertions" or facts that have been derived from a set of raw hits) or hits, the source of those results (e.g., the number of relevant hits that spawned assertions and/or the number of documents where those relevant hits were found). As shown in FIG. 5, the browser 110 or client 105 may display results statistics 505 to the user in conjunction with the partial list of results. If no results were found by the output engine 140, the partial (i.e., empty) list of results may not be displayed, unless the end of the query has been reached. As shown in FIG. 5, the browser 110 or client 105 may also display query progress statistics 510 to a user, such as an indication of the number of documents that have been evaluated by one or more sub-processes, the total number of documents that are being evaluated against the query constraints, the percentage of progress, the number of hits generated by one or more query sub-processes, the CPU time used to generate the results, the total time taken to generate results, and/or whether two or more sub-processes are working in parallel. As shown in FIG. 5, the browser 110 or client 105 may also provide means (e.g., via a refresh button 515 or menu option) for the user to request that the list of partial results be refreshed with additional new results. The browser 110 or client 105 may also provide various input means 520 for the user to adjust the display or output configurations, such as the clustering, ordering or output format used.

At block 227, the server 115 monitors for user input, such as user input to the web browser 110 that indicates that the user would like to receive refreshed partial results and/or receive partial results in a different display or output configuration. At block 230, the server determines if any user input received indicates that the partial results should be refreshed or reconfigured. For example, the server may determine if the user has pressed a refresh button 515. If the user input so indicates, the process 200 repeats starting at block 225 so that the output engine can update the partial list of results with new results and/or reconfigure the results as requested. Otherwise, the process proceeds to block 240. If a user requests a refreshed partial result list but the server has not received any additional query progress notifications since the displayed partial list of results was generated, the server 115 may ignore the request (and/or provide an indication that no additional results are available or take other suitable steps) before proceeding to block 240.

At block 240, the server 115 receives a query progress notification from a query sub-process 130. Returning to a previous example, after a query sub-process has been running for 10 seconds, the server may receive an indication from the sub-process that it has evaluated 26,482 documents against query constraints, out of an index of 600,000 documents, and found 1,548 hits among those 26,482 documents.

At block 245, the server 115 updates (e.g., via the web browser 110 or client 105) the query progress statistics 510 that are being displayed to a user. For example, the server may indicate to the user that now 26,482 documents (or 4%) out of an index of 600,000 of documents have been evaluated. These updated progress statistics may be displayed in conjunction with means (e.g., a refresh button 515 or menu option) for the user to request that the list of partial results be refreshed with additional results from the newly evaluated documents.

At block 250, the server 115 determines if the query has completed, e.g., each of the query sub-processes 130 has evaluated each document in its respective index or sub-index against its query constraints, or alternatively, a sufficient number of hits and/or results have been generated that satisfy user-supplied limits. If not, the process returns to block 227, where the server again monitors for user input. If the query has completed, the process returns. Although not shown, before returning the server may take additional steps to provide a complete list of all responsive results to the user, such as: notifying the user that the query has completed, waiting for user input indicating that the full list of responsive results should be output, requesting the output engine 140 to analyze all of the hit files 135 generated, and/or refreshing the displayed list of results to reflect the full list of responsive results.

Although FIG. 2 describes refreshing partial results at block 225 only upon user input, in some examples, the partial results lists may instead be refreshed on a periodic or infrequent basis, e.g., as waypoints are reached or specified conditions are met. Although FIG. 2 describes refreshing or updating displayed query progress statistics upon the occurrence of query progress notifications, in some examples the displayed query progress statistics may be updated upon user demand (e.g., via a statistics refresh button and/or menu option).

Query Sub-Process

FIG. 3 is a flow diagram illustrating a process for performing a query sub-process so that partial text mining results may be presented to a user. Although the process 300 is described as being performed by a query sub-process, it may in some examples be performed by other components in the environment 100 and/or in other environments. The process begins at block 305, when the query sub-process receives a sub-query request. The sub-query request indicates the query constraints that the sub-process should test and the sub-index (or index) against which the query constraints should be tested. The sub-query request may also indicate waypoint criteria, as described above.

At block 310, the query sub-process 130 accesses the indicated sub-index, which contains structured content information for a subset of documents; also, the current document position of the query sub-process is set to the start of the sub-index. At block 315 where the next document is analyzed, the query sub-process analyzes query constraints against the sub-index from the current document position to find a candidate document and updates the current document position. At block 316 the query sub-process analyzes the query constraints against the candidate document to find a set of hits. For example, if the query is directed to finding documents where the concept "breast cancer" is found within 5 words of the concept "gene" in the Abstract region, the query sub-process may analyze the portion of the index that characterizes the abstract of the candidate document to determine if these concepts can be found therein with the desired proximity.

If the query constraint includes an unordered linguistic pattern or phrase (described previously) the query sub-process 130 may use a heap data structure to efficiently find which of the items in the pattern or phrase occurs next in a document.

At decision block 317, the query sub-process determines if any hits were found at block 316. If not, the process 300 repeats starting at block 315. Otherwise, if one or more matches or hits are found at block 316, the process 300 proceeds to block 320 where the query sub-process 320 may write a description of the hits to the hit file 135 that is associated with the sub-process. The query sub-process may also update progress statistics related to the sub-process, such as by incrementing counters or timers that reflect the number of documents processed, the number of hits found by the sub-process, the CPU time used, and/or the time elapsed.

At block 325, the query sub-process analyzes the current progress of the sub-process against received waypoint criteria to determine if a waypoint has been reached. Returning to a previous example, the query sub-process may determine whether 1000 hits have been found and/or 5 seconds have elapsed since the beginning of the process and/or the last waypoint. Using the results of this analysis, at block 330, the query sub-process determines if it has reached a waypoint, i.e., the waypoint criteria have been met. If a waypoint has not been reached, the process 300 proceeds to block 340. Otherwise if a waypoint has been reached (e.g., by virtue of the time elapsed or the number of hits found), the process proceeds to block 335, where the query sub-process may write a waypoint indication to its associated hit file 135 that indicates a waypoint has been reached. At block 335, the query sub-process also sends a query progress notification to the server 115 that indicates progress statistics such as the number of documents processed, the number of hits found, and/or other progress statistics such as those described previously. The query progress notification may also provide an indication of the waypoint indication that was written to the hit file and/or an indication of the location of its associated hit file.

At block 340, the query sub-process 130 determines if it has reached the end of the sub-index, i.e., it has evaluated all documents in the sub-index against the query constraints. If not, the process 300 repeats starting at block 315. Otherwise, the process proceeds to block 345, where the query sub-process sends a final query progress notification to the server. In addition to the progress statistics described previously, the final query progress notification may also indicate that the entire sub-index assigned to the query sub-process has been evaluated. The process then returns.

Generating Results

FIG. 4 is a flow diagram illustrating a process for generating text mining results so that partial text mining results may be presented to a user. Although the process 400 is described as being performed by an output engine 140, it may in some examples be performed by other components in the environment 100 and/or in other environments. The process begins at block 405, when the output engine receives a request to generate results in a specified format. The request may, for example, indicate the hit files that the output engine should analyze and specify waypoints within those hit files that the output engine should utilize (typically the latest waypoints). The request may also indicate the query constraints that were specified by the user. At block 410, the output engine 140 may read and parse the contents of each of the indicated hit files until it reaches the specified waypoint indicator written to the file. The output engine 140 does not read beyond this indicated waypoint indicator, since a query sub-process 130 may still be adding additional hits beyond the last waypoint indicator in the hit file.

At block 415, in accordance with specified query constraints and the specified format, the output engine 140 analyzes, combines and otherwise reformulates hits that have been read from hit files 135 in order to generate formatted results and result statistics. For example, the output engine 140 may analyze the hits from one or more query sub-processes 130 in order to determine how to organize the hits so that they are grouped and/or ordered in accordance with user preferences. As yet another example, during a multi-query, the output engine 140 may perform combination operations (e.g., difference operations) upon the hits in two or more hit files. Operations can be nested e.g. a union of one query with a subtraction of a second query from a third query.

In some examples, after the output engine 140 combines the contents of various hit files and analyzes the combination of those hit files, the output engine 140 may not find a single responsive result. For example, an intersection operation on two hit files may yield no results if the two hit files did not each contain a single common entry. Thus, at block 420, the output engine 140 determines whether block 415 yielded one or more valid results (e.g., one or more assertions or hits) that are responsive to the user's initial query. If not, the process proceeds to block 435, wherein the output engine 435 sends a notification (e.g., to the server 115) that no results were obtained. Otherwise, if one or more responsive results were obtained, at block 430, the output engine 140 writes the results and/or results statistics in a specified format (e.g., to a results list 125). Additionally, at block 430, the output engine may provide an indication to the server 115 of the results, e.g., by providing the server with an indication of the location of the results list and/or providing results statistics.

Parallel Query Sub-Processes

As mentioned previously, in some examples, the server 115 may initiate multiple parallel, query sub-processes 130 in order to identify hits. In such examples, each query sub-process may evaluate query constraints against a subset of the entire index that the user wishes to evaluate (i.e., against a specific sub-index). For example, a user may wish to perform a text mining query upon a body of one million medical research papers. The content of that body of papers may be characterized by ten separate text mining sub-indices, each of which characterizes approximately 100,000 documents. An index may be decomposed into any suitable set of sub-indices, for example, a sub-index may be associated with a subset of documents that were published during a certain time period or in a certain publication, based on machine parameters and so on. A user may specify, e.g., via client 105, whether they wish to use parallel sub-indices and/or may indicate how to sub-divide or split an index into sub-indices. In some examples, processing may occur in parallel according to various factors including machine load.

When partial results are displayed in certain arrangements, such as ordered by document number within an index, a user may become confused if during a refresh operation the server immediately displays all of the partial results attributable to all of the multiple, parallel query sub-processes. For example, a user may be viewing partial results from a third query sub-process that are sorted by document number. When the user requests (e.g., at block 230) that the server refresh the partial list of results, there may be additional hits that were newly generated by a different, first query sub-process. If those new hits are immediately translated into results that are immediately displayed during the refresh operation, the new results might "bury" the earlier results from the third query sub-process that the user was just viewing. Thus, in some examples where parallel query sub-processes 130 are utilized, during the process 200, at block 225, the server 115 may not always utilize all of the hits that have been generated by all of the query sub-processes, but may instead use only the hits generated by some of the query sub-processes. For example, the server 115 may first generate and display only the partial results attributable to a first query sub-process until the first query sub-process completes, then it may generate and display only the partial results attributable to the first and second query sub-processes until the second query sub-process completes, then it may generate and display only the partial results attributable to the first, second and third query sub-processes until the third sub-process completes, and so on. Although many query sub-processes are effectively generating and "buffering" hits in the background, these hits are not utilized immediately to create partial results; instead results for these hits are displayed serially, as each query sub-process completes.

Multi-Queries

As mentioned previously, in some examples, a user may specify a multi-query that combines two or more discrete constituent queries using combination operations (e.g., intersection, difference, etc.), where each constituent query is defined by its own set of query constraints and thus generates its own set of "hits." In order to generate clear and valid partial results for a multi-query, the combination operations should be performed on hit sets that were all calculated by analyzing the same subset of documents. Multi-queries may be handled by the server 115 and other components in different fashions to ensure valid partial results are obtained. For multi-query cases, the server 115 may provide the output engine 140 with a definition of the desired combination for the multi-query, including an indication of the desired combination operations.

In some examples, the server 115 initiates a single query sub-process to handle all of the constituent queries upon a single subset of documents (i.e., a single index or sub-index) and waypoints of the various constituent queries may be synchronized. In such examples, during the process 300, for each iteration shown in FIG. 3, a single query sub-process 130 repeats blocks 315-320 multiple times; each pass analyzes a candidate document in light of the set of query constraints associated with a different single constituent query. If a hit is found at block 316, the specific hit is written at block 320 to a hit file that is specific to both the query sub-process (i.e., sub-index) and a constituent query. In this way, each of the constituent queries constantly "keeps up" with the other constituent queries to ensure valid results.

In some other examples, the server 115 also initiates a single query sub-process 130 to handle all of the constituent queries upon a single subset of documents (i.e., a single index or sub-index) and waypoints of the various constituent queries may be synchronized. In these examples, during the process 300, multiple branches of blocks 315-340 may be performed in parallel. Each parallel branch utilizes a different set of query constraints associated with a single constituent query and writes to a separate hit file that is specific to both the query sub-process and the constituent query of that branch. In such an example, when decision block 330 is evaluated for a branch, if the waypoint criteria has been satisfied, the process 300 waits until all of the other various branches of blocks 315-340 have finished analyzing the same set of documents before blocks 335 and 340 are performed; blocks 335-340 are then performed simultaneously for all of the multiple branches in order to create consistent waypoints across all the branches. Alternatively, in some examples, different branches of blocks 315-340 may be performed sequentially; for example N iterations of one branch associated with a first constituent query may be performed, then N iterations of a second branch associated with a second constituent query may be performed, then N iterations of a third branch associated with a third constituent query may be performed, and so on. In such examples, when a waypoint is reached in one branch, the other branches are brought to a consistent point (i.e., so that all branches analyzed the same set of documents) before blocks 335 and 340 are performed; blocks 335-340 are then performed simultaneously for all of the multiple branches in order to create consistent waypoints across all the branches.

In the aforementioned examples, the waypoint criteria evaluated at block 330 may be specific to a single branch or constituent query (e.g., the waypoint criteria may require that at least one constituent query has generated 1000 hits) or may amalgamate hits obtained from or progress made by two or more branches (e.g., the criteria may require that all of the constituent queries have collectively generated 1000 hits).

In other examples, the server 115 initiates separate query sub-processes 130 to handle the different constituent queries upon a subset of documents (i.e., a single index or sub-index) and waypoints of the various constituent queries may be synchronized. That is, the different query sub-processes may apply a different set of query constraints at blocks 315-316, and each sub-process writes to its own hit file that is specific to the query sub-process (e.g., specific to a particular sub-index) and constituent query. In such examples, during the process 200 at block 225, before generating partial results, the server 115 determines what common subset of the documents has been processed in accordance with all of the separate constituent queries. To do so, the server 115 may utilize the query progress notifications received from the various sub-processes, e.g., at waypoints. When the server determines what common subset of the documents has been processed by all of the separate constituent queries, at block 225, it indicates to the output engine 140 what subset of the various hit files should be combined in accordance with the multi-query in order to create a valid partial list of results. To do so, the server 115 may provide waypoint indicators to the output engine 140 that correspond to the common subset of documents that has been evaluated against all of the different constituent queries.

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." As used herein, the terms "connected," "coupled," or any variant thereof means any connection or coupling, either direct or indirect, between two or more elements; the coupling or connection between the elements can be physical, logical, or a combination thereof. Additionally, the words "herein," "above," "below," and words of similar import, when used in this application, refer to this application as a whole and not to any particular portions of this application. Where the context permits, words in the above Detailed Description using the singular or plural number may also include the plural or singular number respectively. The word "or," in reference to a list of two or more items, covers all of the following interpretations of the word: any of the items in the list, all of the items in the list, and any combination of the items in the list.

The above Detailed Description of examples of the invention is not intended to be exhaustive or to limit the invention to the precise form disclosed above. While specific examples for the invention are described above for illustrative purposes, various equivalent modifications are possible within the scope of the invention, as those skilled in the relevant art will recognize. Those skilled in the art will appreciate that various architectural changes to the system may be made while still providing similar or identical functionality. For example, the system may be implemented in a variety of environments including a single, monolithic computer system, a distributed system, as well as various other combinations of computer systems or similar devices connected in various ways. For example, while processes or blocks are presented in a given order, alternative implementations may perform routines having steps, or employ systems having blocks, in a different order, and some processes or blocks may be deleted, moved, added, subdivided, combined, and/or modified to provide alternative or subcombinations. Each of these processes or blocks may be implemented in a variety of different ways. Also, while processes or blocks are at times shown as being performed in series, these processes or blocks may instead be performed or implemented in parallel, or may be performed at different times. Further any specific numbers noted herein are only examples: alternative implementations may employ differing values or ranges.

The teachings of the invention provided herein can be applied to other systems, not necessarily the system described above. The elements and acts of the various examples described above can be combined to provide further implementations of the invention. Some alternative implementations of the invention may include not only additional elements to those implementations noted above, but also may include fewer elements.

Any patents and applications and other references noted above, including any that may be listed in accompanying filing papers, are incorporated herein by reference. Aspects of the invention can be modified, if necessary, to employ the systems, functions, and concepts of the various references described above to provide yet further implementations of the invention.

These and other changes can be made to the invention in light of the above Detailed Description. While the above description describes certain examples of the invention, and describes the best mode contemplated, no matter how detailed the above appears in text, the invention can be practiced in many ways. Details of the system may vary considerably in its specific implementation, while still being encompassed by the invention disclosed herein. As noted above, particular terminology used when describing certain features or aspects of the invention should not be taken to imply that the terminology is being redefined herein to be restricted to any specific characteristics, features, or aspects of the invention with which that terminology is associated. In general, the terms used in the following claims should not be construed to limit the invention to the specific examples disclosed in the specification, unless the above Detailed Description section explicitly defines such terms. Accordingly, the actual scope of the invention encompasses not only the disclosed examples, but also all equivalent ways of practicing or implementing the invention under the claims.

To reduce the number of claims, certain aspects of the invention are presented below in certain claim forms, but the applicant contemplates the various aspects of the invention in any number of claim forms. For example, while only one aspect of the invention is recited as a means-plus-function claim under 35 U.S.C sec. 112, sixth paragraph, other aspects may likewise be embodied as a means-plus-function claim, or in other forms, such as being embodied in a computer-readable medium. (Any claims intended to be treated under 35 U.S.C. §112, ¶6 will begin with the words "means for", but use of the term "for" in any other context is not intended to invoke treatment under 35 U.S.C. §112, ¶6.) Accordingly, the applicant reserves the right to pursue additional claims after filing this application to pursue such additional claim forms, in either this application or in a continuing application.

The invention claimed is:

1. A computer-implemented method for providing query results in response to a user-submitted query, the method comprising:
   receiving from a user a user-submitted query; and
   analyzing a set of text-based files based on the user-submitted query,
      wherein the analysis of the set of text-based files includes using text mining techniques to:
         extract structured information from unstructured or semi-structured text, and
         present relationships between entities extracted from the unstructured or semi-structured text; and,
      before all of the text-based files in the set are analyzed, providing to the user partial results that identify a subset of results extracted using at least text mining techniques that satisfy the user-submitted query;
      wherein the user-submitted query is a multi-query comprising two or more constituent queries,
      wherein analyzing a set of text-based files based on the user-submitted query comprises synchronizing two or more waypoints, and
      wherein each of the two or more waypoints is associated with a different constituent query.

2. A computer-implemented method for providing query results in response to a user-submitted query, the method comprising:
   receiving from a user a user-submitted query; and
   analyzing a set of text-based files based on the user-submitted query,
      wherein the analysis of the set of text-based files includes using text mining techniques to:
         extract structured information from unstructured or semi-structured text, and
         present relationships between entities extracted from the unstructured or semi-structured text; and,
      before all of the text-based files in the set are analyzed, providing to the user partial results that identify a subset of results extracted using at least text mining techniques that satisfy the user-submitted query;
      wherein analyzing a set of text-based files based on the user-submitted query comprises analyzing query constraints against candidate documents within the set of text files in order to find hits that are written to two or more hit files, wherein each hit file also includes one or more waypoint indicators; and wherein, before all of the text-based files in the set are analyzed, providing to the user partial results that identify a subset of results comprises:
reading the two or more hit files until a waypoint indicator in each of the two or more hit files is reached such that one or more hits is identified; and
reformulating the identified one or more hits into the subset of results.

3. The method of claim 2, further comprising:
displaying statistics to the user regarding a progress of the analysis to indicate how many of the set of text-based documents have been analyzed; and,
wherein the partial results are provided after a predetermined period of time has elapsed, or after a predetermined number of results or hits have been found in the set of text-based files, or after a predetermined number of documents have been processed.

4. The method of claim 2, further comprising:
receiving an indication from a user that the user should be provided with refreshed partial results; and,
before all of the text-based files in the set are analyzed, providing to the user refreshed partial results that identify another subset of results that satisfy the user-submitted query.

5. The method of claim 2 wherein the user-submitted query specifies:
one or more query constraints, wherein the one or more query constraints include at least: a concept, a class, a linguistic pattern, or a document region; and,
a text mining index for analyzing the set of text-based files.

6. The method of claim 2 wherein the user-submitted query specifies:
the query constraints,
the query constraints are to be evaluated against a text mining index, and
the one or more query constraints include at least a concept chosen from a taxonomy.

7. The method of claim 2 wherein:
each hit is an instantiation of at least one query constraint; and,
wherein at least one of the partial results provided indicates a fact derived from one or more hits.

8. The method of claim 2 wherein each hit is an instantiation of at least one query constraint.

9. The method of claim 2 wherein an entity is a linguistic unit, an individual concept, a class, or a quantitative expression, wherein the user-submitted query specifies one or more of the query constraints, wherein the one or more query constraints include at least one of: an unordered linguistic pattern and a linguistic pattern that spans more than one sentence, and wherein a linguistic unit is a noun group, verb group, or preposition.

10. The method of claim 2, wherein the partial results are updated periodically upon the occurrence of a set of predetermined conditions.

11. A non-transitory computer-readable storage medium storing instructions for a client computer to perform a method of receiving query results in response to a user-submitted query, the method comprising:
providing to at least one server computer a user-submitted query,
wherein the client computer is coupled to the server computer via a computer network,
wherein the client computer includes a browser for use in displaying information received from the computer network, and
wherein the query is directed to a set of documents; and,
before all of the documents in the set are analyzed by the server computer, displaying partial results extracted using at least text mining techniques that satisfy the user-submitted query,
wherein the partial results are a subset of results that satisfy the user-submitted query, and,
wherein the set of documents is analyzed by the server computer using text mining techniques to:
extract structured information from unstructured or semi-structured text, and
present relationships between entities extracted from the unstructured or semi-structured text;
wherein the set of documents is analyzed by the server computer using text mining techniques using multiple parallel query sub-processes, each of which analyzes a corresponding subset of the set of documents; and,
wherein the method further comprises providing an indication of how a text mining index should be decomposed into two or more sub-indices, and wherein at least one of the two or more sub-indices are used by each of the query sub-processes to analyze its corresponding subset of the set of documents.

12. The non-transitory computer-readable storage medium of claim 11 wherein the method further comprises displaying query progress statistics before all of the documents in the set are analyzed by the server computer and intermittently updating the displayed query progress statistics.

13. The non-transitory computer-readable storage medium of claim 11 wherein the user-submitted query is a multi-query that combines two or more constituent queries via one or more combination operations.

14. The non-transitory computer-readable storage medium of claim 11 wherein displaying partial results before all of the documents in the set are analyzed by the server computer further comprises:
displaying the partial results in a clustered arrangement; and,
displaying the partial results in conjunction with a control that enables a user to expand a particular result to examine textual evidence for the particular result.

15. The non-transitory computer-readable storage medium of claim 11 wherein displaying partial results before all of the documents in the set are analyzed by the server computer further comprises at least one of the following:
displaying some or all of the partial results in a clustered arrangement, wherein either a sentence is displayed in a key cluster column or a concept identifier is displayed in a key cluster column; and,
displaying at least one of the partial results in conjunction with the entire text of a document region that provides textual evidence of the at least one of the partial results.

16. The non-transitory computer-readable storage medium of claim 11 wherein displaying partial results before all of the documents in the set are analyzed by the server computer further comprises displaying the partial results in an ordered arrangement.

17. The non-transitory computer-readable storage medium of claim 16 wherein the partial results are ordered by one or more of the following: a document identifier, a frequency of a term or terms, a frequency of a relationship, and alphanumerically.

18. The non-transitory computer-readable storage medium of claim 11 wherein the method further comprises displaying updated partial results in a manner that does not obscure partial results that were previously displayed.

19. The non-transitory computer-readable storage medium of claim 11 wherein the method further comprises providing to the at least one server computer a refined user-submitted query from the user after the partial results are displayed.

20. A system to provide results to a query, wherein the query is applied to a set of documents, and wherein the system is coupled to a client computer via a computer network, the system comprising:
at least one server computer configured to receive a query from the client computer;
at least one query sub-process coupled to the server computer and configured to direct the query to analyze at least some documents in a set of documents;
wherein the query sub-process produces partial hits before all of the documents in the set are analyzed,
wherein the partial hits are a subset of the hits in the set of documents that match the query,
wherein the set of documents are analyzed using text mining techniques to:
extract structured information from unstructured or semi-structured text, and
present relationships between entities extracted from the unstructured or semi-structured text, and
wherein the query from the client computer is a multi-query comprising two or more constituent queries
wherein analyzing the set of documents comprises synchronizing two or more waypoints, and
wherein each of the two or more waypoints is associated with a different constituent query; and,
an output component configured to receive hits produced from the query sub-process,
wherein the output component is further configured to produce partial results extracted using at least text mining techniques based on the partial hits from the query sub-process.

21. The system of claim 20, further comprising:
a web server, coupled to the output component, and configured to provide a web browser in order that the client computer can display the partial results for and wherein the computer network is a public computer network.

22. The system of claim 20 wherein the set of documents include unstructured and semi-structured text files, and wherein the text mining techniques convert unstructured or semi-structured text into structured facts or relationships.

23. A system for providing query results in response to a user-submitted query, the system comprising:
means for receiving a user-submitted query;
means for analyzing a set of text-based files based on the user-submitted query,
wherein the analysis of the set of text-based files includes using text mining techniques to:
extract structured information from unstructured or semi-structured text, and
present relationships between entities extracted from the unstructured or semi-structured text,
wherein the set of text-based files is analyzed using text mining techniques using multiple parallel query sub-processes, each of which analyzes a corresponding subset of the set of text-based files,
wherein the analysis of the set of text-based files comprises decomposing an index into two or more sub-indices, and
wherein at least one of the two or more sub-indices are used by each of the query sub-processes to analyze its corresponding subset of the set of text-based files; and,
means for providing to the user partial results before all of the text-based files in the set are analyzed, wherein the partial results are a subset of results extracted using at least text mining techniques that satisfy the user-submitted query.

* * * * *